United States Patent
Wass et al.

[11] Patent Number: 5,860,669
[45] Date of Patent: Jan. 19, 1999

[54] BALL-EXCHANGE TRAILER HITCH SYSTEM

[76] Inventors: Lloyd G. Wass, 1670 Blackhawk Cove, Eagan, Minn. 55122; Michael Nelson, Rte. 2, Box 100, Henry, S. Dak. 57243; Kurt L. Drewelow, 214 E. Mound St., Shakopee, Minn. 55379

[21] Appl. No.: 802,913

[22] Filed: Feb. 20, 1997

Related U.S. Application Data

[62] Division of Ser. No. 654,011, May 28, 1996, Pat. No. 5,741,022, which is a continuation of Ser. No. 346,859, Nov. 30, 1994, abandoned.

[51] Int. Cl.$^6$ ..................................................... B60D 1/06
[52] U.S. Cl. ..................... 280/416.1; 280/507; 280/511; 403/131; 403/324; 403/328
[58] Field of Search .................. 280/507, 511, 280/491.5, 415.1, 416.1; 403/194, 324, 328, 131, 128, 378; 411/348

[56] References Cited

U.S. PATENT DOCUMENTS

| | | | |
|---|---|---|---|
| 2,696,392 | 12/1954 | Case | 280/513 |
| 2,884,261 | 4/1959 | Farr | 280/512 |
| 3,414,295 | 12/1968 | Rendessy | 280/511 |
| 3,442,534 | 5/1969 | McCorkle | 280/511 |
| 3,630,546 | 12/1971 | Church | 280/511 |
| 3,782,762 | 1/1974 | Nagy et al. | 280/507 |
| 3,963,264 | 6/1976 | Down | 280/415 A |
| 4,201,400 | 5/1980 | Hoogenbosch | 280/511 |
| 4,230,336 | 10/1980 | Avrea et al. | 280/507 |
| 4,232,877 | 11/1980 | Milton | 280/415 A |
| 4,319,766 | 3/1982 | Corteg et al. | 280/511 |
| 4,433,854 | 2/1984 | Smith | 280/511 |
| 4,522,421 | 6/1985 | Vance | 280/511 |
| 4,596,406 | 6/1986 | Van Vleet et al. | 280/511 |
| 4,889,356 | 12/1989 | Morris | 280/416.1 |
| 4,938,496 | 7/1990 | Thomas et al. | 280/511 |
| 5,040,817 | 8/1991 | Dunn | 280/511 |
| 5,085,452 | 2/1992 | Janeiro | 280/511 |
| 5,116,072 | 5/1992 | Swenson | 280/511 |
| 5,135,247 | 8/1992 | Alfaro et al. | 280/415.1 |
| 5,169,168 | 12/1992 | Harry et al. | 280/511 |
| 5,280,941 | 1/1994 | Guhlin | 280/507 |

*Primary Examiner*—Anne Marie Boehler
*Attorney, Agent, or Firm*—Sand & Sebolt; John M. Vasuta

[57] ABSTRACT

A ball-exchange trailer bitch system having a post for receiving a ball where the ball is removable from the post for exchangeability with different size balls. The system includes at least a double locking feature between the ball and post. The double lock consists of a side pin lock and a ball and cage lock. The system may also include a third lock which includes threads on the post and the ball.

20 Claims, 7 Drawing Sheets

BALL-EXCHANGE TRAILER HITCH SYSTEM

This application is a division of application Ser. No. 08/654,011 filed May 28, 1996 which application is now U.S. Pat. No. 5,741,022, which is a File-Wrapper Continuation of application of Ser. No. 08/346,859 filed on Nov. 30, 1994 now abandoned.

BACKGROUND OF THE INVENTION

The present invention relates to a trailer hitch system in which trailer balls can be exchanged easily and quickly.

Since the advent of the "horseless carriage" early in this century, vehicle owners have found it useful to pull various types of trailers behind them. Early trailers were usually connected to tow vehicle draw bars with a bolt or pin. This arrangement was noisy (due to the necessary looseness of the connection which allows for ease of turning) and often unsafe. As technology pertaining to both vehicles and roads improved in the 1930's and 1940's thus causing road speeds to increase, the need for more efficient and reliable trailer couplers became evident. As a result, the use of ball type couplers became increasingly popular and, after World War II, nearly all new light and medium duty trailers were factory outfitted with ball couplers (also referred to as ball sockets).

The trailer has proven to be a convenient and very versatile piece of equipment that can be easily adapted for a wide variety of uses with an accompanying wide range of load carrying capabilities. As a result, the need for and use of various size (and strength) ball couplers has become common. This situation has generally resulted in the use of 1⅞" ball couplers for lightweight trailers, 2" ball couplers for medium weight trailers and 2 15/16" ball couplers on heavy weight trailers.

As the availability and widespread use of specialty consumer products such as boats, riding lawn mowers, snowmobiles and all-terrain vehicles has proliferated in recent years, so has the need for, and use of, specialty trailers to transport them. Also, technological improvements in 4-wheel-drive vehicles has made it possible to routinely pull a wide variety of trailers in both on and off-road situations. This trend has been accelerated since the mid 1980's by the availability and increasing popularity of the highly versatile "sport utility" vehicles—vehicles that afford comfort and power for highway towing while still having ample road clearance and ruggedness for off-road trailer moving.

As a result, a situation has developed where vehicle owners routinely require or encounter the need to pull a wide variety of trailers. These trailers commonly have different size ball couplers. At first glance, this would not seem to present much of a problem, since different size trailer balls can be simply bolted or unbolted to vehicle bumpers and/or hitch draw bars with commonly available wrenches. However, in the real world of rust and rocks, routine installation and removal typically becomes a time-consuming exercise of frustration. Because of safety considerations, trailer balls must be semi-permanently installed to high nut torque values, which requires heavy duty wrenches. This, in turn, results in the need for extra strong wrenches (preferably with "cheater bar" or extension bar capability) for removal. It is not uncommon in severe cases, where trailer balls have been left installed for some time (and have encountered a variety of environmental hazards), to require the aid of a cutting torch to remove the ball. Of course, this renders the ball useless for reinstallation.

Given this background, a widespread need has developed for a "quick change" ball system that permits a tow vehicle to be quickly and easily converted to different ball sizes. The ball system that meets this "quick-change" need must also meet customer demands for safety, user-friendliness and durability.

SUMMARY OF THE INVENTION

The ball-exchange trailer hitch system is a unique configuration including an interlocking ball and a post that allow various size trailer balls to be easily and quickly installed. The interlocking ball is either double or triple locked onto a pre-installed and permanently mounted post. The double lock system utilizes a side pin lock and ball and cage lock. The triple locking system utilizes both the side pin lock and the ball and cage lock of the double lock system above plus a screw thread connection which creates a third locking feature. Both systems provide levels of security, reliability and user-friendliness unattainable from other ball hitch systems.

DETAILED DESCRIPTION OF THE PREFERRED EMBODIMENTS

Figure 1:
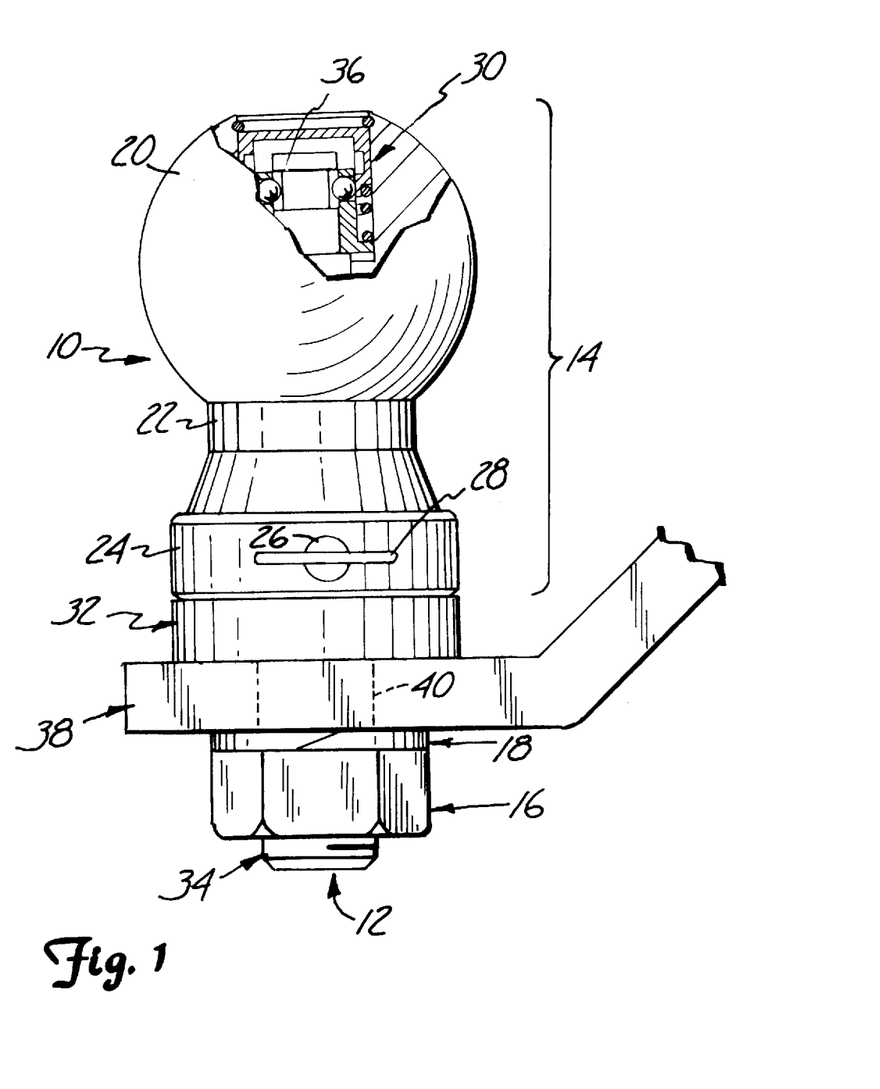
FIG. 1 is a side view with portions broken away of the ball exchange trailer hitch system.

An exchangeable trailer ball hitch system 10 is shown in FIG. 1. This system makes exchanging various size ball hitches quick and easy. Exchangeable trailer ball hitch system 10 comprises a post 12, a ball 14, and a nut 16. Exchangeable trailer ball hitch system 10 may also include a lock washer 18.

Ball 14 includes a spherical portion 20, a neck portion 22, and a base portion 24. Ball 14 further includes two locking systems or mechanisms for interlocking post 12 and ball 14. The first locking mechanism is a side pin lock 26 with a spiral ring 28 attached thereto. The second locking mechanism is a ball and cage lock 30.

Post 12 includes a flange 32, a threaded lower shaft 34, and a ball receiving upper shaft 36. Post 12 is mounted on plate 38, which may be a draw bar, bumper, or other ball hitch support on a vehicle, and which has an aperture 40 therein. Threaded shaft 34 on post 12 is inserted into aperture 40 such that flange 32 rests on plate 38. Nut 16 is threaded onto threaded shaft 34 of post 12 so that post 12 is securely fastened to plate 38. Flange 32 and lock washer 18 of nut 16 sandwich plate 38 therebetween. Ball 14 is selectively attachable to and detachable from post 12 when side pin lock 26 and ball and cage lock 30 are engaged or disengaged, respectively. This allows the user of exchangeable trailer ball hitch system 10 to exchange various balls of different sizes as needed without having to remove nut 16.

The steps to exchange a ball with another ball are as follows. Ball 14 must be disengaged from post 12. Side pin lock 26 and ball and cage lock 30 must both be disengaged for this to occur. The disengagement of side pin lock 26 and ball and cage lock 30 may occur simultaneously or sequentially. For ease of use, the sequential method is preferred since side pin lock 26 may be disengaged and the ball may be turned thereby prohibiting re-engagement. Ball and cage lock 30 may then be disengaged and ball 14 removed from post 12. There may also be sufficient play in ball and cage lock 30 such that side pin lock 26 may be disengaged and ball 14 may be slightly lifted so that re-engagement does not occur. In either case, or through simultaneous disengagement of the locking mechanisms, ball 14 is detached from post 12 and may be removed. Another ball, which may be of similar or dissimilar shape and size, then may be attached to post 12. This exchangeability allows the vehicle user to easily tow trailers having varying sizes of sockets on each trailer tongue because the user can quickly and easily change ball sizes and shapes.

The attachment of ball 14 to post 12 merely requires placing ball 14 on ball receiving shaft 36 of post 12 and lowering ball 14 over ball receiving shaft 36 until base portion 24 is adjacent to flange 32. Ball and cage lock 30 will automatically interlock with ball receiving shaft 36 while side pin lock 26 engages ball receiving shaft 36 if properly aligned. If proper alignment does not occur, the user merely needs to rotate ball 14 until side pin lock 26 springs into engagement.

Figures 2A, 2B:
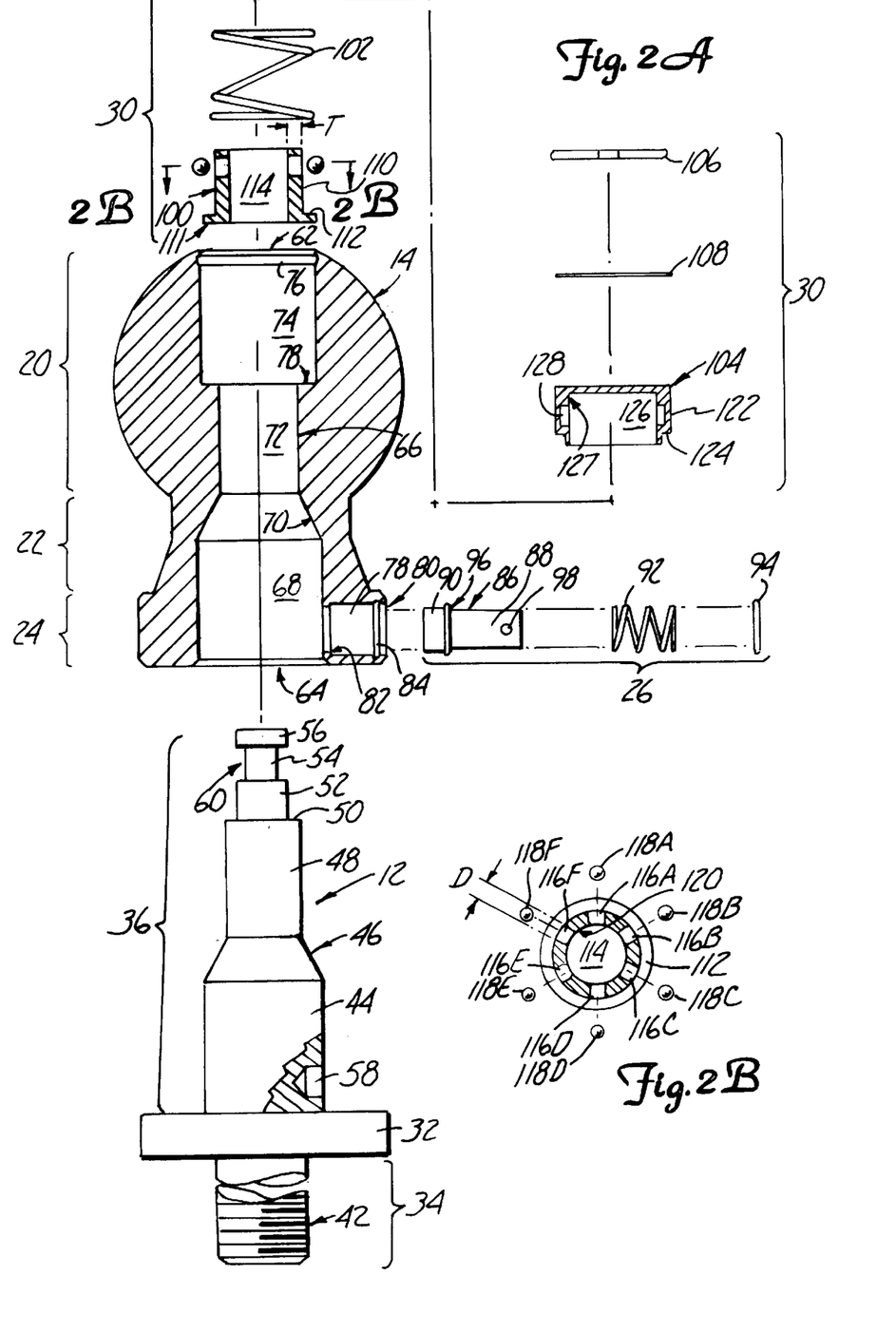
FIG. 2A is an exploded, side sectional view of the ball exchange trailer hitch system of FIG. 1.
FIG. 2B is a top sectional view of the quick connect cage and ball bearings as shown at section 2B—2B of FIG. 2A.

Post 12, ball 14, side. pin lock 26, and ball and cage lock 30 are shown in more detail in the exploded partially sectioned view in FIG. 2A. FIG. 2A shows ball 14 disengaged and removed from post 12. Side pin lock 26 and ball and cage lock 30 are shown exploded away from ball 14. Post 12 comprises threaded lower shaft 34 having a plurality of threads 42, flange 32, and ball receiving upper shaft 36 which includes a pin lock receiving section 44, a ball stop shoulder 46, a ball and cage lock support section 48, a lock support shoulder 50, a ball and cage receiving section 52, a ball bearing interaction section 54, and a locking flange 56. Side pin lock receiving section 44 includes a side pin lock seat 58. The smaller diameter of ball bearing interaction section 54 in comparison to adjacent parts ball and cage receiving section 52 and flange 56 results in a ball locking channel 60.

Ball 14 has spherical portion 20 with a lock opening 62, neck portion 22, and base portion 24 with a post opening 64. A bore 66 extends from lock opening 62 to post opening 64. Bore 66 comprises a lower bore section 68, a post stop shoulder 70, an intermediate bore section 72, and a upper bore section 74 with a snap ring receiving ridge or groove 76 therein. Upper bore section 74 has a cage support shoulder 77 therein. A side pin lock bore 78 extends from lower bore section 68 to a side pin lock opening 80. Side pin lock bore 78 includes a pin stop shoulder 82 and a snap ring ridge or groove 84. Side pin lock 26 comprises a lock pin 86 with a spring receiving portion 88 and a post engaging portion 90, a spring 92, and a snap ring 94. Lock pin 86 includes a spring shoulder 96 in between spring receiving portion 88 and post engaging portion 90, and a ring connecting aperture 98 for receiving spiral ring 28.

Ball and cage lock 30 includes a quick connect cage 100, a spring 102, a quick connect housing 104, and a snap ring 106. Ball and cage lock 30 may also include a label 108 containing instructions or other operational directions. Quick connect cage 100 is a cylindrical body 110 having a base 111 that defines a cage flange 112. Cylindrical body 110, as shown in more detail in FIG. 2B, has an internal bore 114 and six (6) bearing bores 116A, 116B, 116C, 116D, 116E, and 116F which are radial to bore 114. Each of the bearing bores contains a bearing 118A, 118B, 118C, 118D, 118E, and 118F.

Each of the bearing bores 116A–116F has a diameter D. The innermost circumference of each bearing bore 116A–116F, where the innermost circumference is along an inner surface 120 of cylindrical body 110, is of slightly smaller diameter than the rest of the bearing bore. This slightly smaller diameter creates a circumferential ridge in each bore so that bearings 118A–118F cannot completely pass through bearing bores 116A–116F, respectively, and into bore 114.

Quick connect housing 104 is a cylindrical body 122 having a housing shoulder 124. Cylindrical body 122 has an internal cavity 126 for receiving cylindrical body 110. Internal cavity 126 has a generally cylindrical shape with a race or circumferential groove 128 around the entire perimeter of an inner surface 127 in the internal cavity 126.

Spring 102 slides over cylindrical body 110 and rests on cage flange 112. The other end of spring 102 rests on housing shoulder 124. Ball and cage lock 30 is inserted into upper bore section 74 in ball 14 and spring 102 is compressed until snap ring 106 is positioned in snap ring groove 76. Base 111 of quick connect cage 100 rests against cage support shoulder 77 while the top of quick connect housing 104 rests against snap ring 106. These two outer restrictions place spring 102 in compression which results in quick connect cage 100 being biased away from quick connect housing 104.

In a similar manner, spring 92 slides over spring receiving portion 88 and lock pin 86 is inserted into side pin lock bore 78 such that spring shoulder 96 rests against pin stop shoulder 82. Spring 92 is then compressed until snap ring 94 is positioned into snap ring groove 84. Pin stop shoulder 82 prohibits further insertion of lock pin 86 into bore 66 when ball receiving shaft 36 is not in bore 66.

Figure 3:
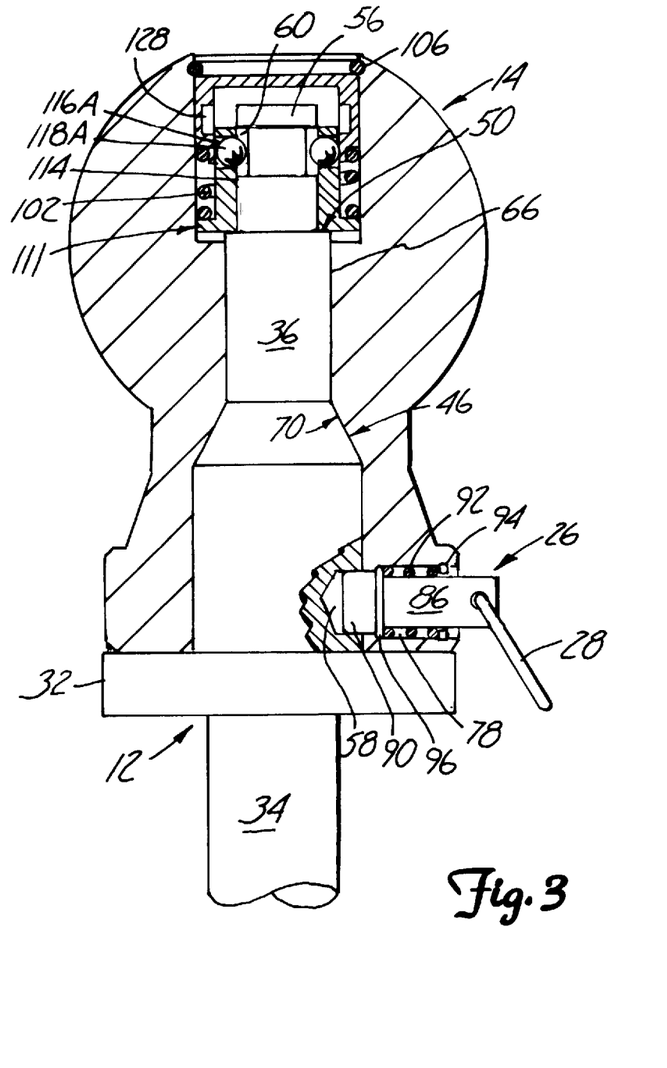
FIG. 3 is a side sectional view of the ball exchange trailer hitch system of FIG. 1 when in a double locked position.

FIG. 3 discloses ball 14 fully inserted onto ball receiving shaft 36 of post 12 such that both locking mechanisms, i.e., side pin lock 26 and ball and cage lock 30, are engaged.

Ball 14 is prohibited from sliding off of post 12. Spring 92, which is in compression, is fixed against snap ring 94 such that the compression of the spring forces post engaging portion 90 away from snap ring 94. Post engaging portion 90 of side pin lock 26 extends inward into bore 66 from base portion 26 of ball 14 and seats in side pin lock seat 58 of post 12. The insertion of post engaging portion 90 into side pin locks seat 58 secures ball 14 onto post 12. The compression of spring 94 is sufficient to bias spring shoulder 96 away from snap ring 94.

Similarly, ball bearings 118A–118F extend inward into ball locking channel 60 such that locking flange 56 is restricted from passing between ball bearings 118A–118F. The diameter D of each of ball bearings 118A–118F is larger than the thickness of cylindrical body 110 resulting in a portion of each ball bearing always extending into bore 114 or hanging out in race 128. The compression position of spring 102 causes quick connect cage 100 and quick connect housing 104 to oppose one another. Race 128 and bearing apertures 116A–116F are not aligned due to this opposition. Ball bearings 118A–118F are forced inward into ball locking channel 60 by inner surface 127 since race 128 is not aligned with ball bearing bores 116A–116F. This prohibits ball bearings 118A–118F from moving within ball bearing apertures 116A–116F into an outward position where the bearings do not extend into ball locking channel 60.

Figure 4:
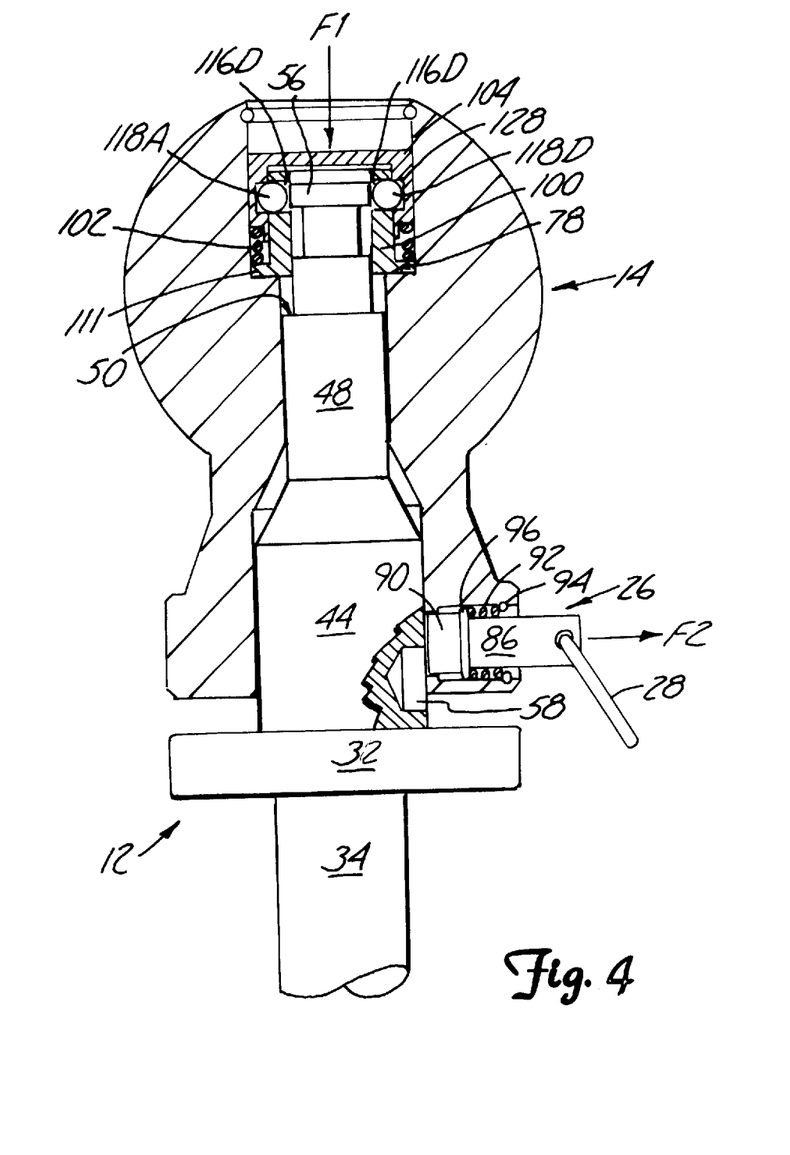
FIG. 4 is a side view of the ball exchange trailer hitch system of FIG. 1 when disengaged.

FIG. 4 shows side pin lock 26 disengaged from post 12. A force F2 is placed upon side pin lock 26 such that post engaging portion 90 is withdrawn from side pin lock seat 58. Force F2 is typically placed upon spiral ring 28. The compression spring 92 is increased as spring shoulder 96 compresses spring 92 against snap ring 94. After post engaging portion 90 is fully removed from side pin lock seat 58, ball 14 is rotatable around post 12 such that side pin lock 26 is no longer aligned with side pin lock seat 58.

FIG. 4 shows side pin lock 26 disengaged from post 12 and ball and cage lock 30 in a disengaged position such that locking flange 56 is not deterred by ball bearings 118A–118F from sliding out of bore 66 as ball 14 is removed from post 12. A force F1 is placed on quick connect housing 104 to push the housing away from snap ring 106. This movement of quick connect housing 104 away from snap ring 106 compresses spring 102 further resulting in internal cavity 126 further receiving quick connect cage 100. The result of quick connect housing 104 receiving quick connect cage 100 is the alignment of race 128 with ball bearing bores 116A–116F. This alignment removes the restriction on ball bearings 118A–118F that inner surface 127 presents. Ball bearings 118A–118F are thus movable within ball bearing bores 116A–116F. Bearings 118A–118F may then move from the position where the bearings extend into bore 114, as shown in FIG. 3, to the position where the bearings hang out in race 128, as shown in FIG. 4. The pulling of ball 14 off of post 12 causes. locking flange 56 to press against ball bearings 118A–118F thereby moving them out into race 128 such that locking flange 56 may exist out of internal bore 114.

Figure 5:
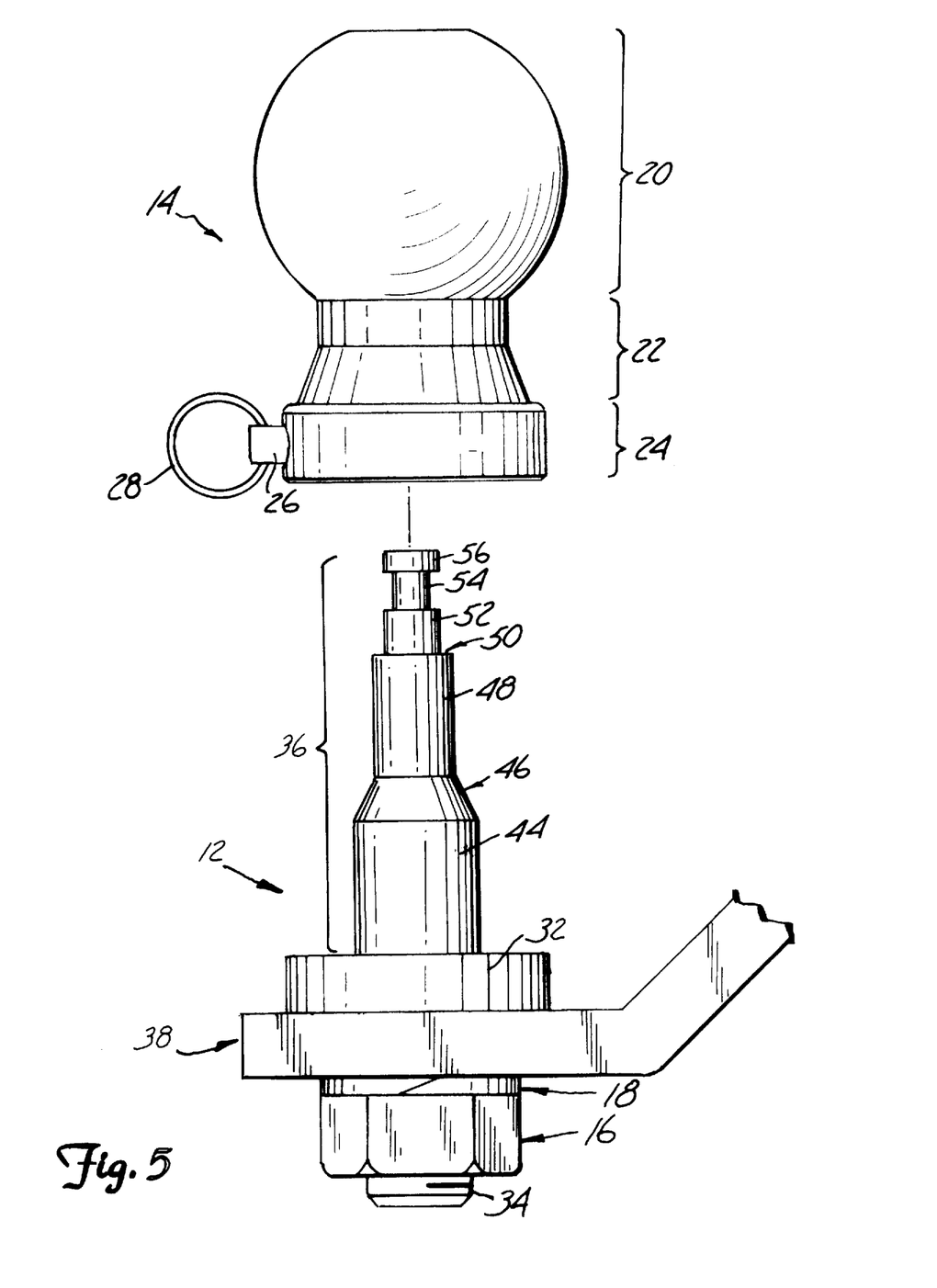
FIG. 5 is a side sectional view of the ball exchange trailer hitch system in FIG. 1 just after each of the locks has disengaged.

Ball 14 may then be completely removed from post 12 as is shown in FIG. 5. After ball receiving shaft 36 is removed from bore 66, post engaging portion 90 of side pin lock 26 is pushed into bore 66 based upon the compression of spring 92. Similarly, quick connect housing 104 is pushed away from quick connect cage 100 and back into contact with snap ring 106. Post 12 remains attached to plate 38 on the vehicle. Ball 14 need not be immediately replaced and may be stored in a trunk or other location away from post 12. Eventually, the user of the vehicle will want ball 14 or another ball of similar or dissimilar size and shape to be positioned onto post 12.

To connect or reconnect ball 14 onto post 12, align bore 66 in ball 14 with ball receiving shaft 36 of post 12. Ball 14 is then lowered onto ball receiving shaft 36 until base portion 24 rests upon flange 32. Ball bearings 118A–118F are extending into bore 114 at this time because quick connect cage 100 and quick connect housing 104 are biased away from each other by spring 102. Locking flange 56 engages ball bearings 118A–118F and cannot pass because the bearings are forced inward into ball locking channel 60 by inner surface 127. Continued downward force on ball 14 toward support flange 32 results in locking flange 56 pushing ball bearings 118A–118F upward thereby forcing quick connect cage 100 further into cylindrical housing 126 of quick connect housing 104. Race 128 aligns with ball bearing apertures 116A–116F and allows locking flange 56 to pass because ball bearings 118A–118F moved outward from ball locking channel 60 and into race 128. After locking flange 56 has passed through, spring 102 pushes quick connect cage 100 and quick connect housing 104 away from each other again.

Prior to the placement of ball 14 on post 12, post engaging portion 90 extends into bore 66. The insertion of ball receiving shaft 36 into bore 66 results in post engaging portion 90 being forced out of bore 66 by the various portions of ball receiving shaft 36 including sloped ball stop shoulder 46. When base portion 24 rests upon support flange 32, ball and cage lock 30 will have re-engaged. In contrast, side pin lock 26 may or may not have engaged depending upon the alignment of post engaging portion 90 and side pin lock seat 58. If engagement of side pin lock 26 has not occurred, rotation of ball 14 about post 12 until post engaging portion 90 and side pin lock seat 58 are aligned may be necessary.

The above sequence for disengaging ball 14 from ball 12 was a sequential disengagement procedure since side pin lock 26 may be disengaged before ball and cage lock 30 based upon play in the system as shown in FIG. 3 where locking flange 56 is not immediately adjacent to ball bearings 118A–118F. In contrast, simultaneous disengagement may be designed for by positioning locking flange 56 such that it is adjacent to ball bearing bores 116A–116F. However, if the simultaneous disengaging procedure is designed for, one may still sequentially disengage by disengaging post engaging portion 90 of side pin lock 26 and then rotating ball 14 such that post engaging portion 90 is not aligned with side pin lock seat 58.

Figure 6:
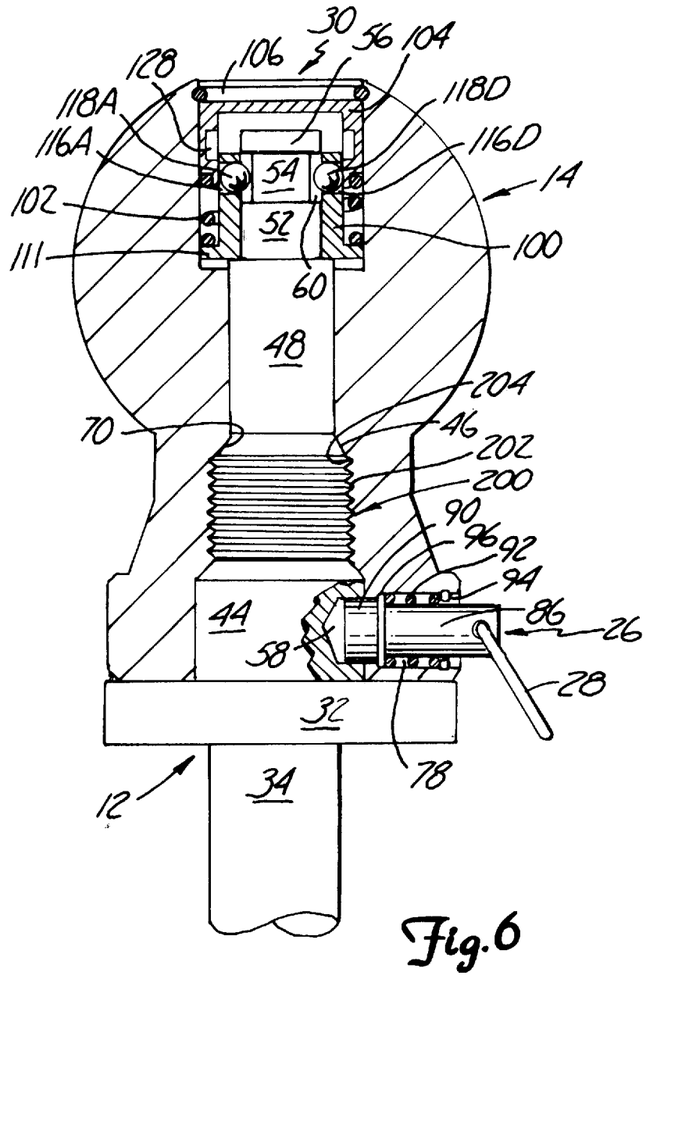
FIG. 6 is a side sectional view of a second embodiment of the ball exchange trailer hitch system when in a locked position.

FIG. 6 discloses an alternative exchangeable trailer ball hitch system which has three locking systems or mechanisms. Elements in this alternative embodiment are identically numbered to identical elements in the embodiment shown in FIGS. 1–5. This three locking mechanism exchangeable trailer ball hitch system includes side pin lock 26 and ball and cage lock 30. A third locking mechanism is a male-female threading lock 200. Post 12 includes a plurality of male threads 202. Ball 14 includes a plurality of female threads 204. When post 12 receives ball 14, male threads 202 mate will female threads 204. FIG. 6 shows male threads 202 and female threads 204 fully mated such that the exchangeable trailer ball hitch system is fully engaged and locked. Post engaging portion 90 of side pin lock 26 is seated inside pin lock seat 58. Locking flange 56 is held in place by ball bearings 118A–118F which are extending into ball locking channel 60 to prohibit locking flange 56 from being pulled from bore 114 in quick connect cage 100. In addition, the mating of male threads 202 to female threads 204 further secures ball 14 to post 12.

Figure 7:
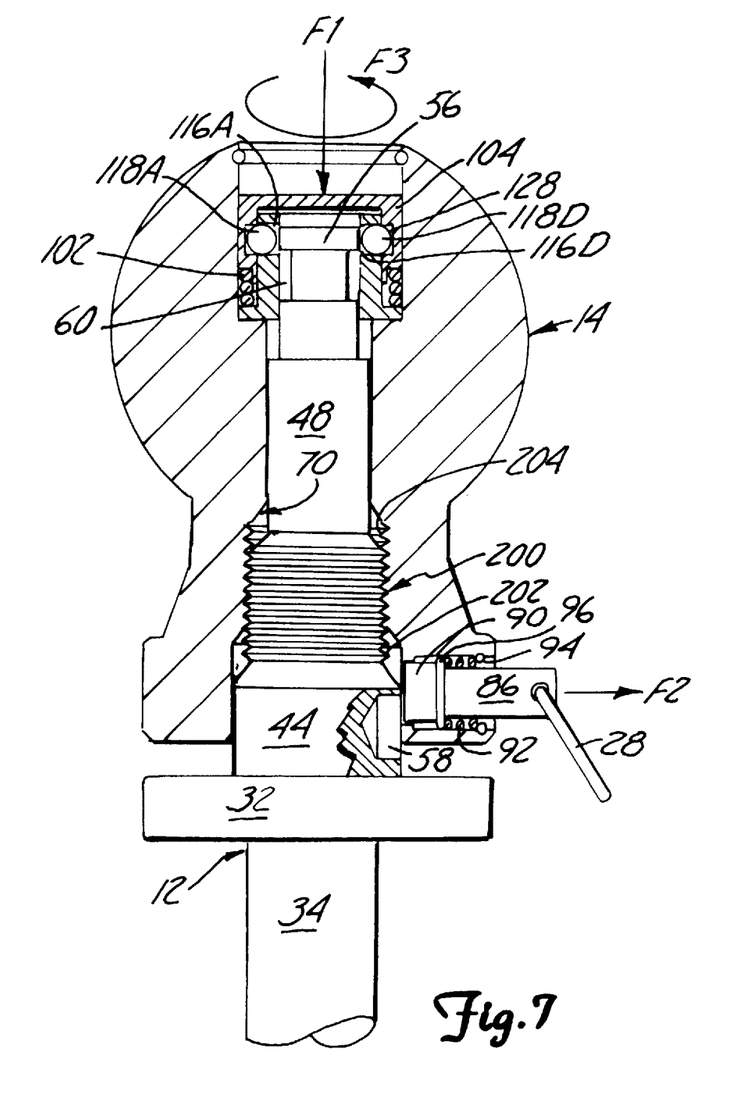
FIG. 7 is a side sectional view of the ball exchange trailer hitch system in FIG. 6 where the locking mechanisms are fully or partially disengaged.

The removal of ball 14 from post 12 is shown in FIG. 7. Forces F1, F2, and F3 are required to disengage the three locking mechanisms. The typically procedure for disengagement is a three-step procedure. First, force F2 is placed upon side pin lock such that post engaging portion 90 is removed from side pin lock seat 58. Second, force F3 is placed upon ball 14 such that ball 14 rotates about post 12 to disengage female threads 204 from male threads 202. Third, force F1 is placed upon quick connect housing 104 to compress the housing such that quick connect cage 100 is received therein. The compression of quick connect cage 100 into quick connect housing 104 aligns race 128 with ball bearing bores 116A–116F to allow ball bearings 118A–118F to move from extending into bore 114 to hanging out in race 128. The exertion of force F3 may occur after the complete disengagement of female threads 204 from male threads 202, or at some point during this disengagement. This process is reversed to position ball 14 back onto post 12.

The exchangeable trailer ball hitch system includes either two or three locking mechanisms such that ball 14 may be securely fastened to post 12 while remaining easily removable. This removability allows the vehicle user to exchange various size and shape balls as is needed to tow different trailers.

Although the present invention has been described with reference to preferred embodiments, workers skilled in the art will recognize that changes may be made in form and detail without departing from the spirit and scope of the invention.

What is claimed is:

1. A method of interchanging one trailer ball for another trailer ball without removing an attachment post for receiving the trailer balls from connection with a tow vehicle, the method comprising:

disengaging a first lock in a ball from contact with a post positioned within a post aperture in the ball, wherein the disengaging of the first lock includes pulling outward on an inwardly biased locking pin positioned in a pin aperture extending through the ball to the post aperture resulting in removal of the pin from a radially inwardly extending notch in the post; and, substantially simultaneously with the disengaging of the first lock, initiating a subsequent disengaging including disengaging a second lock in the ball from contact with the post positioned within the post aperture in the ball, wherein the disengaging of the second lock includes twisting of the ball around the post resulting in the unthreading of female threads within the post aperture from male threads on the post.

2. The method of claim 1 further comprising the step of: subsequent to the disengaging of the second lock, placing another ball having a post aperture extending therein over the post.

3. The method of claim 2 further comprising the step of: subsequent to the placing another ball, mating female threads in the post aperture of the another ball with the male threads on the post.

4. The method of claim 3 further comprising the step of: subsequent to the mating of the female threads to the male threads, aligning an inwardly biased locking pin in the pin aperture extending through the ball to the post aperture with the radially inwardly extending notch into the post resulting in the pin seating within the notch.

5. The method of claim 3 further comprising the step of: subsequent to the mating of the female threads to the male threads, seating the pin within the notch.

6. The method of claim 1 wherein the disengaging steps occur simultaneously.

7. The method of claim 1 wherein the disengaging steps occur sequentially.

8. The method of claim 1 further comprising the step of: prior to disengaging either lock, inserting the ball onto the post.

9. The method of claim 8 wherein the step of inserting the ball onto the post further comprises:

mating the female threads in the post aperture of the ball with the male threads on the post; and, seating the pin within the notch.

10. The method of claim 9 wherein the step of seating the pin within the notch further comprises:

aligning the inwardly biased locking pin in the pin aperture extending through the ball to the post aperture with the radially inwardly extending notch into the post resulting in the pin seating within the notch.

11. A method of providing an trailer ball on a vehicle that is interchangeable without having to remove an attachment post for receiving the trailer ball from connection with the tow vehicle, the method comprising:

rigidly affixing an attachment post onto a vehicle hitch support on a vehicle whereby the attachment post includes a ball receiving shaft having a threaded exterior surface and a pin seat radially extending therein;

positioning a removable trailer ball with a threaded post aperture extending therein over the ball receiving shaft; and at least double locking the removable trailer ball to the attachment post whereby the threaded post aperture is threaded onto the threaded exterior surface of the ball receiving shaft until a radially inwardly biased pin within the trailer ball is aligned with and seated within the pin seat.

12. The method of claim 11 wherein the attachment post further includes a flange radially extending outward in between opposing axial ends of the post.

13. The method of claim 12 wherein the attachment post further includes a vehicle attachment shaft extending from the post opposite the ball receiving shaft.

14. The method of claim 13 wherein the rigidly affixing step further includes inserting the vehicle attachment shaft through an aperture within the vehicle hitch support and installing a fastener upon an outermost end of the vehicle attachment shaft opposite the flange whereby the vehicle support hitch is sandwiched between the flange and the fastener.

15. The method of claim 11 further comprising the step of: subsequent to the double locking of the removable trailer ball to the attachment post, disengaging both locks and removing the trailer ball from the attachment post.

16. The method of claim 15 further comprising the step of: subsequent to disengaging and removing of the trailer ball from the attachment post, positioning another removable trailer ball with a threaded post aperture extending therein over the ball receiving shaft.

17. The method of claim 16 further comprising the step of: subsequent to the positioning of another removable trailer ball over the ball receiving shaft, at least double locking the another trailer ball to the attachment post whereby the threaded post aperture is threaded onto the threaded exterior surface of the ball receiving shaft until a radially inwardly biased pin within the another trailer ball is aligned with and seated within the pin seat.

18. A method of interchanging one trailer ball for another trailer ball without disconnecting the entire trailer ball assembly from the vehicle, the method comprising:

providing an attachment post rigidly affixable to a vehicle hitch support on a vehicle whereby the attachment post includes a ball receiving shaft having a threaded exterior surface and a pin seat radially extending therein, and more than one removable and interchangeable trailer ball with a threaded post aperture extending into the ball for selective receipt of the ball receiving shaft where each ball includes at least two locks for locking that respective removable and interchangeable trailer ball to the attachment post whereby the locks include the threaded post aperture threading onto the threaded exterior surface of the ball receiving shaft until a radially inwardly biased pin within that respective trailer ball is aligned with and seated within the pin seat; and interchangeably attaching one of the trailer balls at a time to the attachment post.

19. The method of claim 18 wherein the step of interchangeably attaching one the trailer balls at a time further comprises positioning one of the removable and interchangeable trailer balls over the ball receiving shaft and threadably twisting the ball thereon until the inwardly biased pin aligns with and seats within the pin seat.

20. The method of claim 19 further comprising the step of:

subsequent to the positioning one of the removable and interchangeable trailer balls over the ball receiving shaft and threadably twisting the ball thereon until the inwardly biased pin aligns with and seats within the pin seat, removing that one removable and interchangeable trailer ball from over the ball receiving shaft by overcoming the inward pin bias to remove the pin from the seat and threadably twisting the ball off of the ball receiving shaft and replacing that one ball with another ball.

* * * * *